United States Patent [19]

Kobelt

[11] 4,013,148
[45] Mar. 22, 1977

[54] INTERNALLY LIQUID COOLED DISC BRAKE

[76] Inventor: Jacob Kobelt, 6100 Oak St., Vancouver, British Columbia, Canada, V6M 2W2

[22] Filed: Jan. 9, 1976

[21] Appl. No.: 647,753

[52] U.S. Cl. .......................... 188/264 D; 188/71.6; 188/218 XL; 192/70.12; 192/113 B
[51] Int. Cl.[2] ........................................ F16D 65/853
[58] Field of Search .......... 188/71.6, 264 D, 264 P, 188/218 XL; 192/70.12, 113 R, 113 B

[56] References Cited

UNITED STATES PATENTS

| 1,131,810 | 3/1915 | Zoller et al. | 188/264 D |
| 2,862,120 | 11/1958 | Onsrud | 188/264 D |
| 3,530,965 | 9/1970 | Wilson | 188/264 D X |

FOREIGN PATENTS OR APPLICATIONS

| 653,565 | 5/1951 | United Kingdom | 188/264 D |
| 701,725 | 12/1953 | United Kingdom | 188/264 D |

Primary Examiner—George E. A. Halvosa
Attorney, Agent, or Firm—Carver and Company

[57] ABSTRACT

Disc brake for heavy-duty application in which peripheral portion of disc has cooling passages to conduct cooling liquid therethrough to remove heat generated by braking. Rotary seal cooperating with disc conducts cool liquid to and if desired can return warmed liquid from the cooling passages. Cooling passages are generally zig-zag shaped and disposed adjacent and extend between braking faces of disc. Passages include plurality of radially and tangentially disposed passages connected at adjacent inner and outer ends. Tangentially disposed passage portions are shorter than radially disposed passage portions. Radially disposed portions are separated by partitions having generally parallel side walls so as to eliminate relatively thick portions of material to reduce formation of hot spots on braking faces.

5 Claims, 6 Drawing Figures

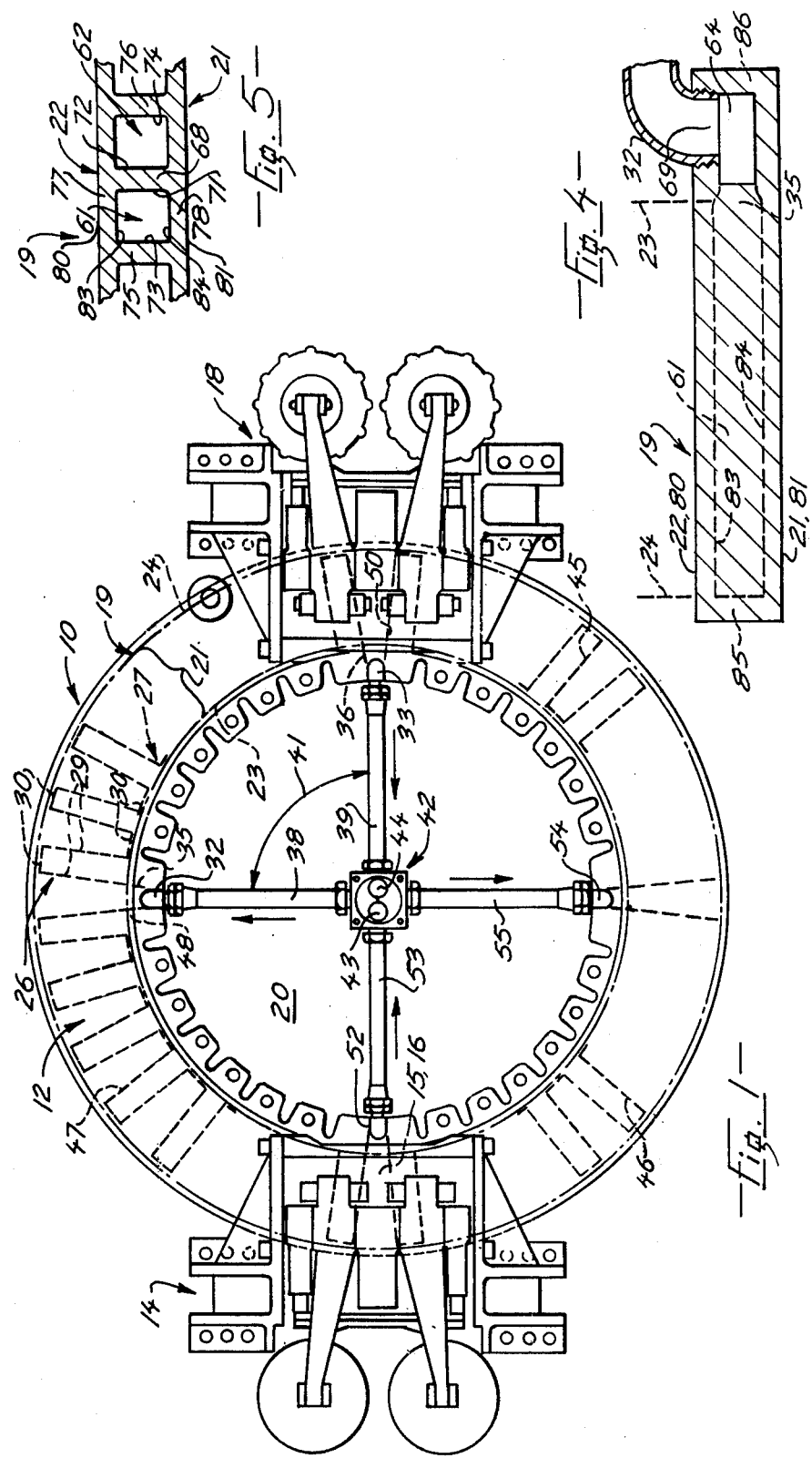

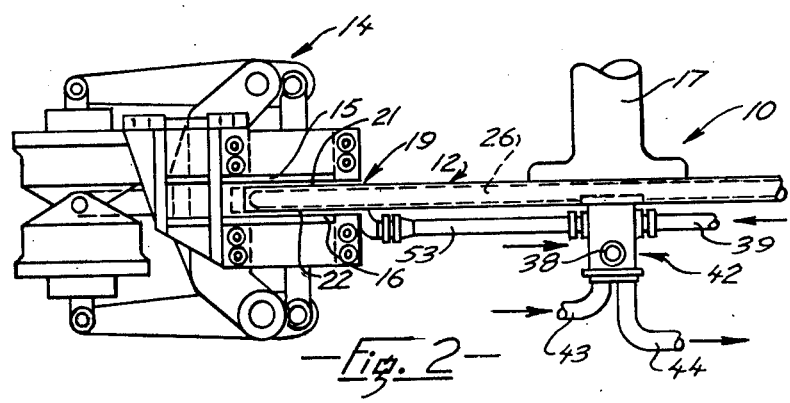
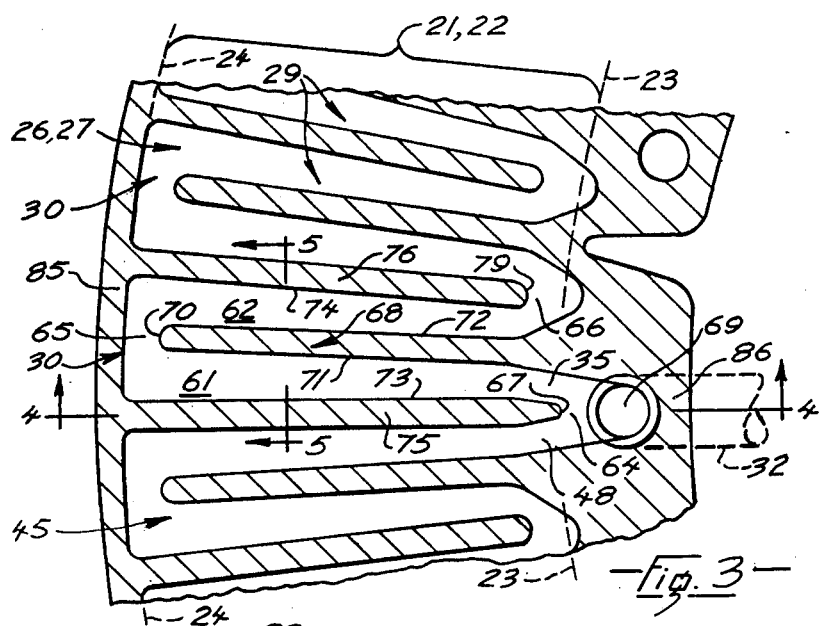
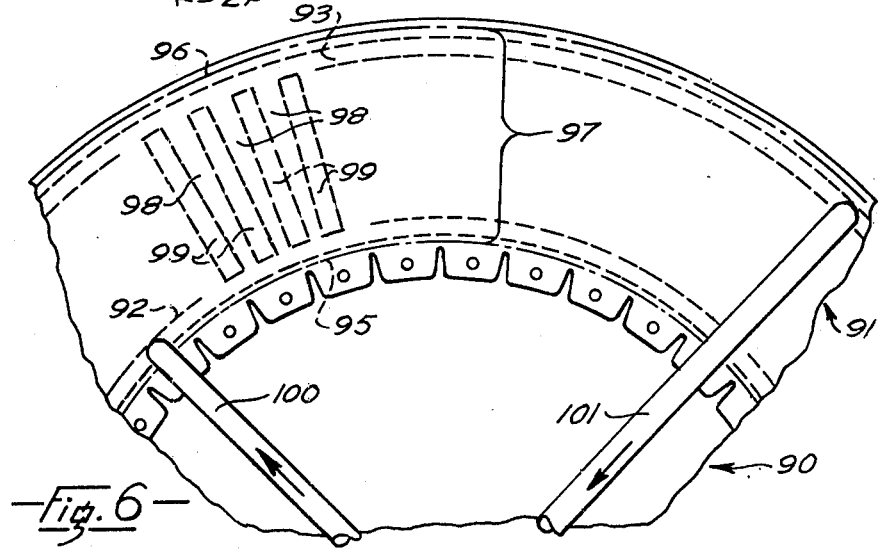

INTERNALLY LIQUID COOLED DISC BRAKE

BACKGROUND OF THE INVENTION

1. Field of the Invention

The invention relates to an internally liquid cooled disc for use in a disc brake assembly, particularly adapted for heavy-duty applications where large quantities of horsepower are to be absorbed.

2. Prior Art

Disc brakes have been used for many years, and in relatively light-duty applications, air cooling of the disc is sufficient to maintain the disc and brake pads within practical operating temperatures. In some heavy-duty applications it is known to spray water externally onto braking faces of the disc to cool the disc and brake pads, but steam produced by this method can be excessive in some applications, thus rendering this method of cooling impractical.

SUMMARY OF THE INVENTION

The present invention reduces difficulties and disadvantages of the prior art by providing a disc for heavy-duty applications which is internally liquid cooled to maintain the disc and brake pads within practical temperatures, but does not produce large quantities of steam.

An internally liquid cooled disc according to the invention has an outer peripheral portion and is mounted on a brake shaft for rotation therewith. The peripheral portion has braking faces on opposite sides thereof adapted to be swept by brake pads of the brake assembly as in common practice. The disc is further characterized by the peripheral portion having cooling passage means therein adjacent the braking faces to conduct a cooling liquid therethrough to remove heat generated by braking. Liquid conducting means conduct the cooling liquid to the cooling passage, and in one embodiment a rotary seal cooperating with the brake shaft connects the cooling passage to a liquid supply means which is stationary relative to the shaft.

A detailed disclosure following, related to drawings describes a preferred embodiment of the invention, which however is capable of expression in structure other than that particularly described and illustrated.

DESCRIPTION OF THE DRAWINGS

FIG. 1 is a simplified side elevation of a disc brake assembly using a disc according to the invention, FIG. 2 is a simplified fragmented top plan of the disc brake assembly, some portions being omitted, FIG. 3 is a fragmented detailed section of a portion of a disc according to the invention, plane of the section being parallel to a braking face, FIGS. 4 and 5, which appear on Sheet 1 of the drawings, are simplified sections of the disc generally on Lines 4-4 and 5-5 respectively of FIG. 3, FIG. 6 is a simplified fragmented diagrammatic side elevation of an alternative embodiment.

DETAILED DISCLOSURE

FIGS. 1 and 2

Referring mainly to FIG. 1, a disc brake assembly 10 has an internally liquid cooled disc 12 according to the invention and a calliper brake assembly 14 having a pair of opposed brake pads 15 and 16. The disc is mounted on a brake shaft 17 for rotation therewith, and it is noted that the calliper brake assembly 14, the shaft 17 and a similar calliper brake assembly 18 diametrically opposite to the assembly 14 form no portion of the present invention. As best seen in FIG. 2, the disc 12 has an outer peripheral portion 19 having braking faces 21 and 22 on opposite sides thereof adapted to be swept by the brake pads 15 and 16 when the brake is actuated. The braking faces have inner and outer limits 23 and 24 defining portions of the disc swept by the brake pads. The peripheral portions 19 is bolted to an inner disc portion 20 and has a castellated inner rim as is common practice.

A portion of the disc adjacent the braking surfaces has a cooling passage means 26 to conduct a cooling liquid therethrough to remove heat generated by braking. The cooling passage means is a generally zig-zag passage 27 and is shown simplified in broken outline and is positioned adjacent and between the braking faces and between the inner and outer limits 23 and 24, so as to provide adequate coverage of the braking faces of the disc to remove heat therefrom. The zig-zag passage 27 is described in greater detail with reference to FIGS. 3-5 and is characterized by a plurality of generally radially disposed passage portions, severally 29, and a plurality of generally tangentially disposed passage portions, severally 30. As can be seen in FIG. 1, the radially disposed portions extend between the limits 23 and 24 of the braking faces and are inter-connected at adjacent inner and outer ends by the tangentially disposed passage portions extending generally along portions of the limits 23 and 24. Thus the passage portions 29 and 30 when connected as described above form a continuous passage passing to and fro between inner and outer limits 23 and 24 of the braking surface.

The cooling passage means 26 has an inlet 35 and an outlet 36 provided with inlet and outlet elbow couplings 32 and 33 respectively. Inlet and outlet conduits 38 and 39 extend from the respective inlet and outlet elbows 32 and 33 to a rotary seal 42 cooperating with the brake shaft 17. The rotary seal can be a conventional rotary seal having two separate liquid routes or passages permitting two separate streams of liquid to pass between two ducts rotating with the shaft and two stationary ducts. One passage in the seal 42 is connected to an inlet pipe 43 which conducts cooling liquid from a cooling supply (not shown) through the seal to the inlet conduit, and the remaining passage in the seal conducts cooling fluid, which is now warmed, from the outlet passage and returns or scavenges it through the seal 42 to an outlet pipe 44 which is connected to a sump (hot shown), or it can be dumped into a body of water. Thus the rotary seal and the conduits serve as liquid conducting means to supply cooling liquid to the cooling passage means, and to return it if required. Undesignated arrows indicate direction of flow of cooling liquid in the conduits and pipes.

The zig-zag passage 27 extends over a portion or arc of the braking face which subtends an angle 41 which is approximately 90 degrees of arc, and three additional separate similar zig-zag passages 45, 46 and 47 also extend in sequence around portions of the braking face. The passage 47, on one side of the passage 27, has an inlet 48 and the passage 45, on an opposite side of the passage 27, has an outlet 50. It is noted that the inlet 48 of the passage 47 is adjacent the inlet 35 of the adjacent passage 27 and both inlets receive cooling liquid from the conduit 38 through the inlet elbow coupling 32. Similarly, the outlet 50 of the passage 45 is adjacent the outlet 36 of the passage 27, and both outlets supply liquid to the outlet elbow coupling 33. Similarly, undesignated outlets of the adjacent cooling passages 46 and 47 are adjacent each other and discharge into a common outlet elbow coupling 52 connected by an outlet conduit 53 to the seal 42, and adjacent inlets of the passages 45 and 46 are connected by an inlet elbow coupling 54 and an inlet conduit 55 to the seal 42. Positioning inlets and outlets of adjacent passages adjacent each other as above is important for reasons as follows. Because the cooling liquid leaving the disc is at a higher temperature than the cooling liquid entering the disc, material of the disc surrounding the inlets will be at a lower temperature than the material surrounding the outlets. If an inlet of one passage were positioned close to an outlet of an adjacent passage, there would be a relatively large temperature difference in the disc material adjacent the inlet and outlet and this would occur over a short distance, producing an undesirably steep temperature gradient. By positioning inlets of adjacent passages near each other, and likewise the outlets near each other, temperature gradients in the disc local to the inlets and outlets are reduced, which gradients might otherwise produce excessive thermal stresses which would tend to distort or crack the disc. Thus life of the disc should be increased.

It is added that, depending on heat transfer requirements, the number of zig-zag passages extending around the periphery of the disc can be greater or lesser than four and in some lighter-duty applications one continuous passage could be provided. However, care might be required to ensure that the temperature differences between the liquid entering the passage and the liquid leaving the passage is not sufficiently excessive to produce the above mentioned distortion or cracking. Thus a plurality of passages could extend in sequence around the disc each passage extending over an approximately equal arc of disc to ensure generally similar temperature differences between the cooling liquid at respective inlets and outlets.

FIGS. 3 through 5

Referring mainly to FIG. 3, a particular portion of the zig-zag passage 27 to be described is adjacent the inlets 35 and 48 of the passages 27 and 45 respectively, which communicate with the elbow coupling 32. As aforesaid, the passage 27 is formed from the radially and tangentially disposed passage portions 29 and 30, two adjacent radially disposed passage portions being specifically designated 61 and 62 and three generally tangentially disposed passage portions being specifically designated 64, 65 and 66. A generally radially disposed partition 68 separates the pair of adjacent passage portions 61 and 62, and the tangentially disposed passage portion 65 extends across an end 70 of the partition to interconnect the adjacent radial passage portions 61 and 62 at outer ends thereof. It is noted that the tangentially disposed passage portion 64 communicates with an inlet port 69 disposed inwardly of the inner limit 23 of the braking surface 22, which port accepts the elbow 32. Also the tangentially disposed passage portions are very much shorter than the radially disposed portions to result in relatively thin partitions between the radially disposed portions. It is noted that the tangentially disposed passage portions 64 and 66 at the inner end of the radial passage portions 61 and 62 are adjacent the inner limit 23 of the braking surface 21, and the portion 65 at the outer end of the passage 61 and 62 is adjacent the outer limit 24.

The partition 68 has two parallel, generally radially disposed partition sidewalls 71 and 72, and similar adjacent partitions 75 and 76 have similar partition sidewalls 73 and 74. Thus the radially disposed passages 61 and 62 have pairs of outwardly diverging partition sidewalls 71 and 73, and 72 and 74 respectively. The tangentially disposed passage portions 64 and 66 extend cross ends 67 and 79 of the partitions 75 and 76.

The partition with parallel sidewalls produces outwardly diverging passages which contrasts with a possible alternative, which is not shown, having parallel passages which produces outwardly diverging partitions. In this alternative, the partition would become relatively thick adjacent outer portions thereof, and the thicker portions tend to produce excessively hot areas spaced around and adjacent the outer limits of the braking faces. These hot areas are termed localized hot spots and increase temperature gradients. Thus it is preferable to have partitions with parallel side walls which reduce formation of hot spots, which reduces excessive temperature gradients and tends to reduce distortion or possible cracking of the disc.

Referring to FIGS. 4 and 5, spaced opposed webs 77 and 78 extend between the adjacent partitions 75 and 68, and have outer surfaces 80 and 81 serving as portions of the braking faces 22 and 21 respectively, and inner surfaces 83 and 84 defining in part the radially disposed passage portion 61. Thus the radially disposed passage portion 61 has opposed parallel pairs of surfaces 71 and 73, and 83 and 84 defining a generally rectangular-sectioned passage. The tangentially disposed passage portion 64 is also rectangular-sectioned which optimizes cross-sectional area of the disc for cooling liquid flow. It is seen that the partition, webs and outer and inner rims 85 and 86 which make up the outer peripheral portion 19 of the disc all have generally similar thickness which reduces formation of hot spots by improving heat transfer. The passage portions in the remainder of the disc are generally similar to the above described portions.

It is noted that by using webs, partitions and rims of generally equal thickness also simplifies manufacturing of the disc if the disc is to be cast. As is well known in foundry techniques, generally speaking, for components having intersecting side walls it is preferred that the side walls have generally equal thickness, or better still, the side walls have thicknesses which decrease in the direction of pouring of the melt. Thus in the present invention the parallel sided partitions having a thickness approximately equal to the thickness of the webs, not only provides good heat transfer and reduces formation of hot spots, but also reduces sudden changes in cross-sectional area and increases the chances of producing sound castings.

Operation of the disc follows that of a normal disc brake, but particular care is required to ensure that the cooling liquid is filtered sufficiently to prevent blockage of the cooling passages as in normal liquid cooling practice.

ALTERNATIVES AND EQUIVALENTS

In some applications, it may not be necessary to return the cooling liquid through the rotary seal, and in these cases the liquid could pass through the oulet to spray into the atmosphere, or into other liquid exhaust means. The alternative is not illustrated.

FIG. 6

An alternative disc 90 has an outer peripheral portion 91 having inner and outer annular manifolds 92 and 93 (shown in broken outline) positioned generally adjacent inner and outer limits 95 and 96 of a braking face 97 of the disc. A plurality of generally radially passages 98 interconnect the inner and outer manifolds to pass cooling liquid therebetween. Only three such passages 98 are shown diagrammatically and these passages are defined in part by opposed side walls of parallel sided partitions, severally 99 shown in broken outline. The partitions and portions of webs, now shown, extending between the partitions produce generally rectangular-sectioned, outwardly diverging radially disposed passages which are equivalent to the passage portions 61 and 62 of FIG. 3. Flow restrictors at the outer end of each passage 98, not shown, might be required to maintain sufficient pressure in the cooling liquid to elevate its boiling point as required. The inner and outer manifolds are connected by inlet and outlet conduits 100 and 101 to appropriate ports in a rotary seal, not shown, so as to receive liquid from, and to return liquid to, the rotary seal. Alternatively the outlet manifold could be connected to other liquid exhaust means.

Thus, in summary, in both embodiments above a portion of the disc adjacent the braking faces has a cooling passage means, namely the plurality of zig-zag passages or the radial passages and the inner and outer manifolds, to conduct a cooling liquid therethrough to remove heat generated by braking. Inlet and outlet conduits connected to the passage means and the rotary seal serve as liquid conducting means to supply cooling liquid to, and return cooling liquid from, the passage means. As in common liquid cooling practice, pressurizing the cooling liquid elevates its boiling point to permit operation at higher temperatures.

I claim:

1. An internally liquid cooled disc for use in a disc brake assembly, the disc having an outer peripheral portion and being mounted on a brake shaft for rotation therewith, the peripheral portion having braking faces on opposite sides thereof adapted to be swept by brake pads of the brake assembly, and cooling passage means positioned adjacent and between the braking faces to conduct a cooling liquid therethrough to remove heat generated by braking, the cooling passage means being generally zig-zag and extending between inner and outer limits of the braking faces and having an inlet and an outlet and a plurality of generally radially disposed passage portions and a plurality of generally tangentially disposed passage portions, portions of the disc adjacent the passage means being further characterized by:

a. a generally radially disposed partition separating each pair of adjacent radially disposed passage portions, each partition having generally parallel side walls to that the radially disposed passage have outwardly diverging radial side walls so as to eliminate relatively thick portions of disc material between portions of the radially disposed passages to reduce formation of excessively hot areas on the braking faces,
   b. a tangentially disposed passage portion extending across one end of each radially disposed partition to interconnect adjacent radially disposed passage portions, the generally tangentially disposed passage portions being adjacent the inner and outer limits of the braking faces and being shorter than the radially disposed passage portions,
   c. spaced opposed web portions extending between adjacent partitions of the disc, the web portions having outer surfaces serving as portions of the braking faces and inner surfaces defining in part the radially disposed passage portions, the webs and partitions having generally similar thicknesses so as to reduce formation of excessively hot areas;
   the assembly further including:
   d. a rotary seal cooperating with the disc and connecting the inlet of the cooling passage means to a supply of cooling liquid.

2. A disc as claimed in claim 1 in which the rotary seal connects the cooling passage outlet to a cooling liquid exhaust.

3. A disc as claimed in claim 1 in which the disc has a plurality of separate zig-zag passages and in which:
   a. each passage extends over an approximately equal arc of the brake faces so that the zig-zag passages extend in sequence around the braking surfaces,
   b. each zig-zag passage has a respective inlet and outlet, the inlet of one passage being adjacent the inlet of an adjacent passage, and the outlet of one passage being adjacent the outlet of an adjacent passage,
so as to reduce temperature gradients within the disc to reduce thermal stresses and to ensure generally similar temperature differences between the cooling liquid at the respective inlets and outlets.

4. A disc as claimed in claim 1 in which the radially disposed passage portions have opposed parallel pairs of surfaces defining generally rectangular-sectioned passages.

5. A disc as claimed in claim 1 in which the disc has an outer rim having a thickness generally equal to the thickness of the partitions and webs to reduce formation of excessively hot areas.

* * * * *